United States Patent
Fister et al.

(10) Patent No.: US 7,596,417 B2
(45) Date of Patent: Sep. 29, 2009

(54) SYSTEM AND METHOD FOR CONFIGURING AND PARAMETRIZING A MACHINE USED IN AUTOMATION TECHNOLOGY

(75) Inventors: Markus Fister, Erlangen (DE); Raimund Kram, Erlangen (DE); Volker Wolff, Amberg (DE)

(73) Assignee: Siemens Aktiengesellschaft, Munich (DE)

( * ) Notice: Subject to any disclaimer, the term of this patent is extended or adjusted under 35 U.S.C. 154(b) by 197 days.

(21) Appl. No.: 11/630,192

(22) PCT Filed: Jun. 17, 2005

(86) PCT No.: PCT/EP2005/052824
§ 371 (c)(1),
(2), (4) Date: Dec. 20, 2006

(87) PCT Pub. No.: WO2005/124479
PCT Pub. Date: Dec. 29, 2005

(65) Prior Publication Data
US 2008/0039959 A1 Feb. 14, 2008

(30) Foreign Application Priority Data
Jun. 22, 2004 (DE) .................. 10 2004 030 032

(51) Int. Cl.
*G06F 19/00* (2006.01)
(52) U.S. Cl. ........................... 700/56; 700/244
(58) Field of Classification Search .............. 700/17, 700/18, 28–29, 56, 86, 244–245, 111, 109, 700/257; 245/208, 436 R; 901/2–3; 72/15.1, 72/20.1
See application file for complete search history.

(56) References Cited

U.S. PATENT DOCUMENTS

| | | | |
|---|---|---|---|
| 5,485,620 A | 1/1996 | Sadre et al. | |
| 5,801,942 A | 9/1998 | Nixon et al. | |
| 6,882,890 B2 * | 4/2005 | Horn et al. | 700/86 |
| 6,981,226 B2 | 12/2005 | Schmitt et al. | |
| 7,243,516 B2 * | 7/2007 | Zusi | 72/20.1 |
| 7,353,677 B2 * | 4/2008 | Zusi | 72/15.1 |
| 2002/0022895 A1 | 2/2002 | Genise et al. | |
| 2002/0049959 A1 | 4/2002 | Horn et al. | |
| 2002/0062159 A1 * | 5/2002 | Draghetti et al. | 700/29 |
| 2003/0167096 A1 | 9/2003 | Nakai | |

FOREIGN PATENT DOCUMENTS

| | | |
|---|---|---|
| DE | 100 38 439 A1 | 2/2002 |
| DE | 102 46 847 A1 | 10/2003 |
| EP | 1 182 528 B1 | 2/2002 |

OTHER PUBLICATIONS

Lim et al., Delvlopment of HMI for automatic control of Electronic-Slag Remelting Process, 2000, Research Institue of Industrial Science and Technology, IEEE, p. 501-507.*

* cited by examiner

*Primary Examiner*—Kidest Bahta

(57) ABSTRACT

An aim of a system and method for configuring and parametrizing a machine used in automation technology is to simplify configuration of an automation process. Said aim is achieved by graphically representing the different technological components as model components. The respective mechatronic signal flow between the technological objects can be defined on a graphic level by means of connections to which the inputs and the outputs of the technological objects can e joined. Such a graphic mechatronic model substantially facilitates projection of an automation process.

16 Claims, 3 Drawing Sheets

SYSTEM AND METHOD FOR CONFIGURING AND PARAMETRIZING A MACHINE USED IN AUTOMATION TECHNOLOGY

CROSS REFERENCE TO RELATED APPLICATIONS

This application is the US National Stage of International Application No. PCT/EP2005/052824, filed Jun. 17, 2005 and claims the benefit thereof. The International Application claims the benefits of German application No. 10 2004 030 032.1 DE filed Jun. 22, 2004, both of the applications are incorporated by reference herein in their entirety.

FIELD OF INVENTION

The present invention relates to a system for configuring and/or parameterizing a machine used in automation technology with a model, the technological objects of which represent function elements of the machine. In addition, the present invention also relates to a corresponding method for configuring or parameterizing a machine which can be automated.

BACKGROUND OF INVENTION

Production machines capable of being automated frequently comprise a large number of modules or function elements. FIG. 1 shows a production machine of this kind in symbolic form. This production machine serves for example to manufacture tablet blisters. A feeder or extractor is provided here as an input station. This is then followed by a production station 1, an intermediate station and a production station n. An output station is arranged at the end of the production track, said output station being realized for instance by a packer or stacker. From the external observer's perspective, these modules are spatially arranged in this sequence.

In order to record the functional relationship between these individual modules, it is advantageous to set up a corresponding mechatronic model. Such a model is illustrated in simplified form in FIG. 2. Here, the mechatronic model not only comprises the actual mechanical components such as the unwinder, production stations and output stations, but also virtual components like the production master, buffer and virtual gears. The mechatronic model further shows the signal flow between these function elements.

For the purposes of translation into a control project, the individual function elements, which can also be described as technological objects, are stored in one or more lists corresponding to FIG. 3. The individual technological objects can be displayed and edited in such a list of tree-like structure. In particular, the individual technological objects can be parameterized there and are interconnected with other technological objects. In this way, a complete system can be configured and parameterized. The disadvantage of this list representation is, however, that the operator can only cope with systems up to a certain level of complexity, and that the functional relationships between the individual technological objects can be represented with only a limited degree of clarity and logical coherence.

The list in FIG. 3 is an alphanumeric list in which the technological objects or components of an automation project are represented and defined for a production machine for example. The list contains details about interdependencies between the technological objects resulting from what is known as "linking"

An industrial controller based on technological objects capable of being distributed is known from the publication EP 1 182 528 A2. The technological objects can be interconnected to form more complex technological objects. To this end a graphical user interface is available, among other resources.

The further publication US 2002/0022895 A1 shows a system configuration editor for programming and configuring a machine control system. A graphical user interface facilitates the configuration of logical and electrical functions. In this way, for example, connections representing actual physical linkages can be created using a mouse.

SUMMARY OF INVENTION

An object of the present invention is thus to facilitate the configuration and or parameterization of a machine which can be automated.

According to the invention, this is achieved by a system for configuring and/or parameterizing a machine capable of being automated with a model, the technological objects of which represent function elements of the machine, with the technological objects of the model being capable of representation in graphic form and a mechatronic signal flow, that is a signal flow of mechatronic values, between technological objects being definable at graphic level. The system according to the invention has a test device to check the consistency of the mechatronic signal flow between the technological objects. This check can be performed in the engineering system and in the sequence system. Project planning is thus significantly simplified for the operator.

According to the invention, a method is further provided for configuring and/or parameterizing a machine which can be automated by providing a model whose technological objects represent function elements of the machine, graphically representing said technological objects of the model and defining a mechatronic signal flow between technological objects at graphic level, as well as checking the consistency of the signal flow of mechatronic values between the technological objects.

Said invention thereby enables the automation of a production machine by means of the modeling of a mechatronic signal flow and use of the existing programming environment for the sequence programming. The mechatronic model can here be directly created in graphic form in a simple manner, and translated correspondingly into the technological objects of the automation project. The visual representation of the mechatronic model here proves to be extremely helpful for the operator. It is likewise advantageous that the graphic representation of the mechatronic modeling and the mechatronic signal flow is separate from the sequence programming. The sequence programming continues to be performed with the customary programming tools and programming editors.

The graphic mechatronic modeling and definition of the technological objects or functions prove to be particularly advantageous in the case of complex production machines, such as complex packaging machines and printing machines with many technological objects. This applies also in particular to machines with a number of similar modules, as these can be simply duplicated, and jointly programmed. The automation projects for such machines are, namely, capable of being represented in project lists for the technological objects only with some difficulty, and subject to poor levels of comprehensibility. As a result of the invention, it is now also possible to define a complex overall system for the automation of a production machine consisting of a programming environment (e.g. language complying with IEC 61131-3 or Structured Text or MotionControlChart) for the sequence programming and of the mechatronic model for modeling of the mechatronic signal flow of the production machine.

With the aid of the inventive graphic configuration system, it is possible, with the aid of graphic aids, to define and provide function objects or technological objects in a user-friendly manner. In addition, mechatronic circuitry between the technological objects can be executed with visual support. A corresponding and suitable graphic tool can be provided to this end. It is here advantageous to reduce the information content of the mechatronic signal flow to that information necessary for the mechatronic modeling, for example by foregoing control and sequence information and function parameterization.

The signal flow of the configuration system of the method according to the invention preferably contains information relating to position, velocity, acceleration, pressure force and/or torque. The mechatronic signal flow can thus expand the mechatronic modeling of motion information into general technological values.

The function elements or technological objects may have real or virtual elements. Thus, for example, it is possible to model not only actuators, sensors and other machine units, but also objects without mechanical equivalence, such as computing modules for modification of the mechatronic signal flow. Advantageously, the function elements can be instantiated, configured, parameterized and assigned commands with graphic support. As this can take place directly from the graphic, mechatronic modeling, user friendliness is significantly improved.

The system according to the invention can have a test device to check the consistency of the mechatronic signal flow. This check can be performed in the engineering system and in the sequence system. Project planning is thus significantly simplified for the operator.

An activation device can further be provided for the activation or deactivation of the technological objects in an online and/or offline manner. This guarantees flexible adaptation to modular applications.

The system can further have a modification device for modifying a signal path for a mechatronic signal flow during the sequence. This enables the technological signal flow to be modified during the sequence In a particularly preferable form of embodiment, the system contains a transformation device for translation of technological objects defined in at least one list into the technological objects represented in graphic form. Said transformation device should conversely be in a position to convert graphic objects into a list format for storage in a project list. The universality and bidirectional convertibility of the graphical representation of the mechatronic machine model and the alphanumeric project lists of the technological components is hereby guaranteed. After the conversion, further processing can take place accordingly, either in list form or graphic form.

BRIEF DESCRIPTION OF THE DRAWINGS

The present invention is explained in greater detail in the appended drawings, which show.

DETAILED DESCRIPTION OF INVENTION

The embodiment example set out in greater detail below represents a preferable form embodying the present invention.

Figure 1:
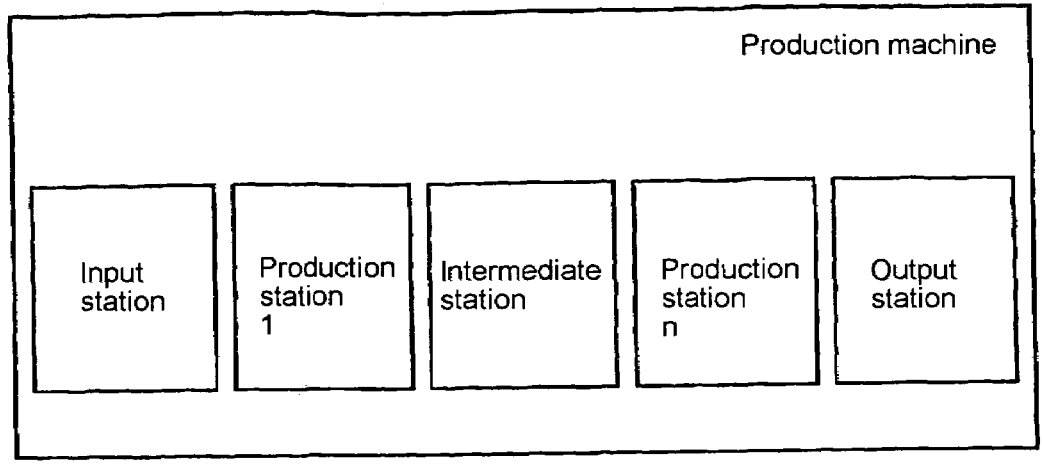
FIG. 1 a spatially modular structure of a production machine.
Figure 2:
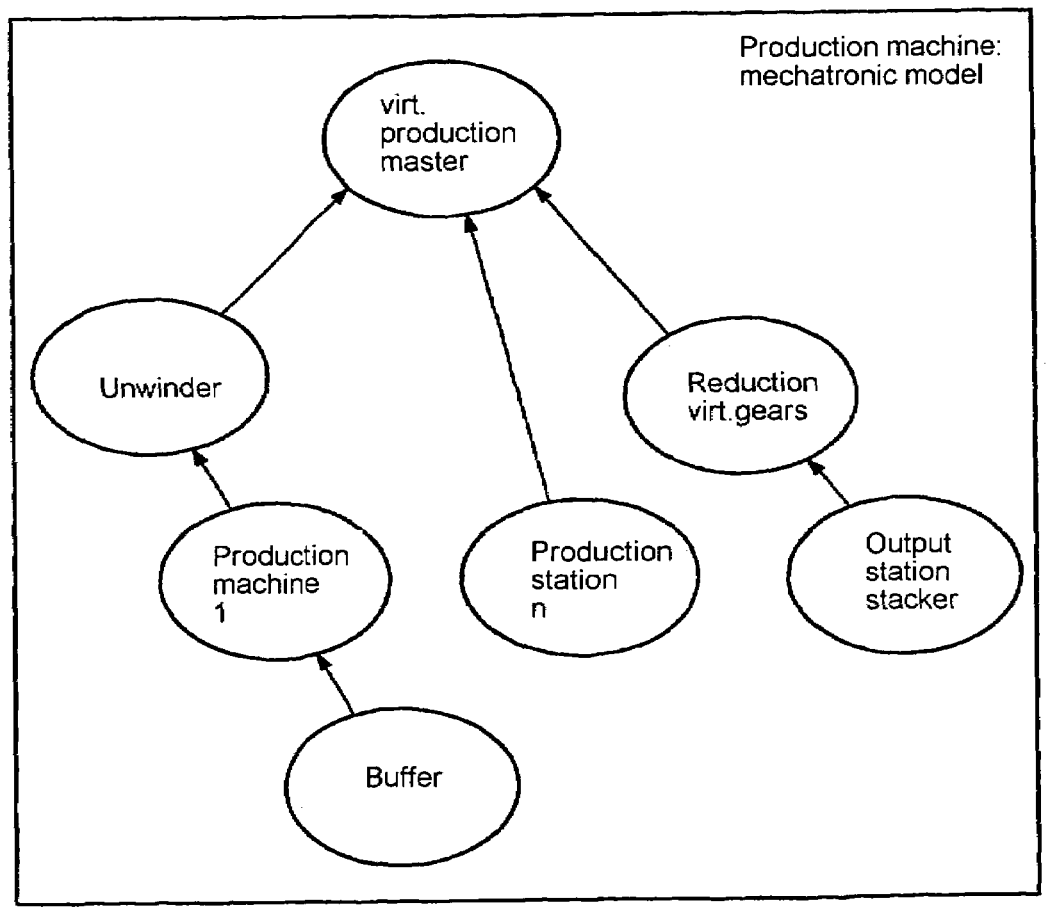
FIG. 2 a mechatronic modeling in accordance with the prior art for a production machine as per FIG. 1.
Figure 4:
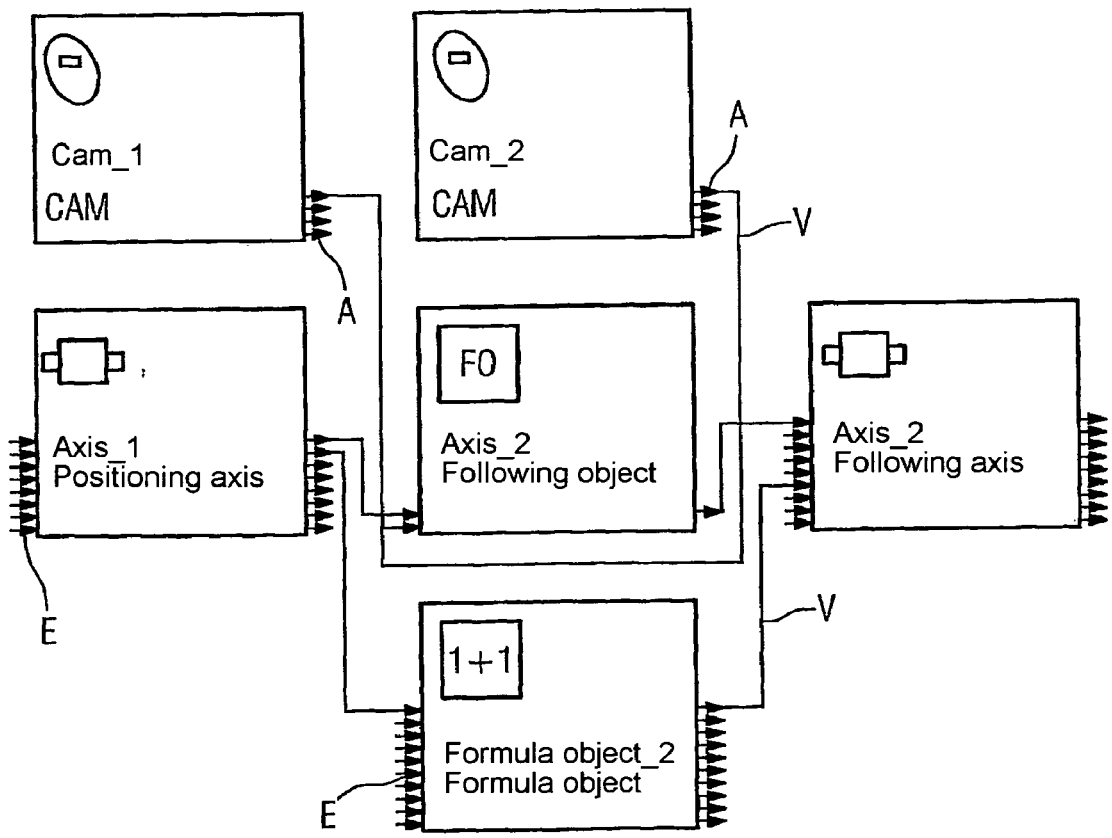
FIG. 4 an inventive visualization of a mechatronic model in summary form.

The mechatronic model reproduced graphically in FIG. 4 corresponds in principle to the model in FIG. 2, as a project designer would depict it. The mechatronic model selected as an example in FIG. 4 comprises six technological objects: two cams, two axes, a synchronous operation object and a computational object. Depending on their function, the technological objects possess different numbers of inputs E and outputs A. The technological objects can be linked by connections V via these inputs E and outputs A. The connections V symbolize a signal flow for the transmission of data relating to position, velocity, acceleration, pressure, force, torque and the like. With these graphic configuration possibilities, the operator can configure a complex automation project in a rapid and clear manner. In the summary representation reproduced in FIG. 4, however, the operator requires knowledge of the individual inputs E and outputs A of each technological object used. The project designer skilled in the art will acquire such knowledge after a certain period.

Figure 5:
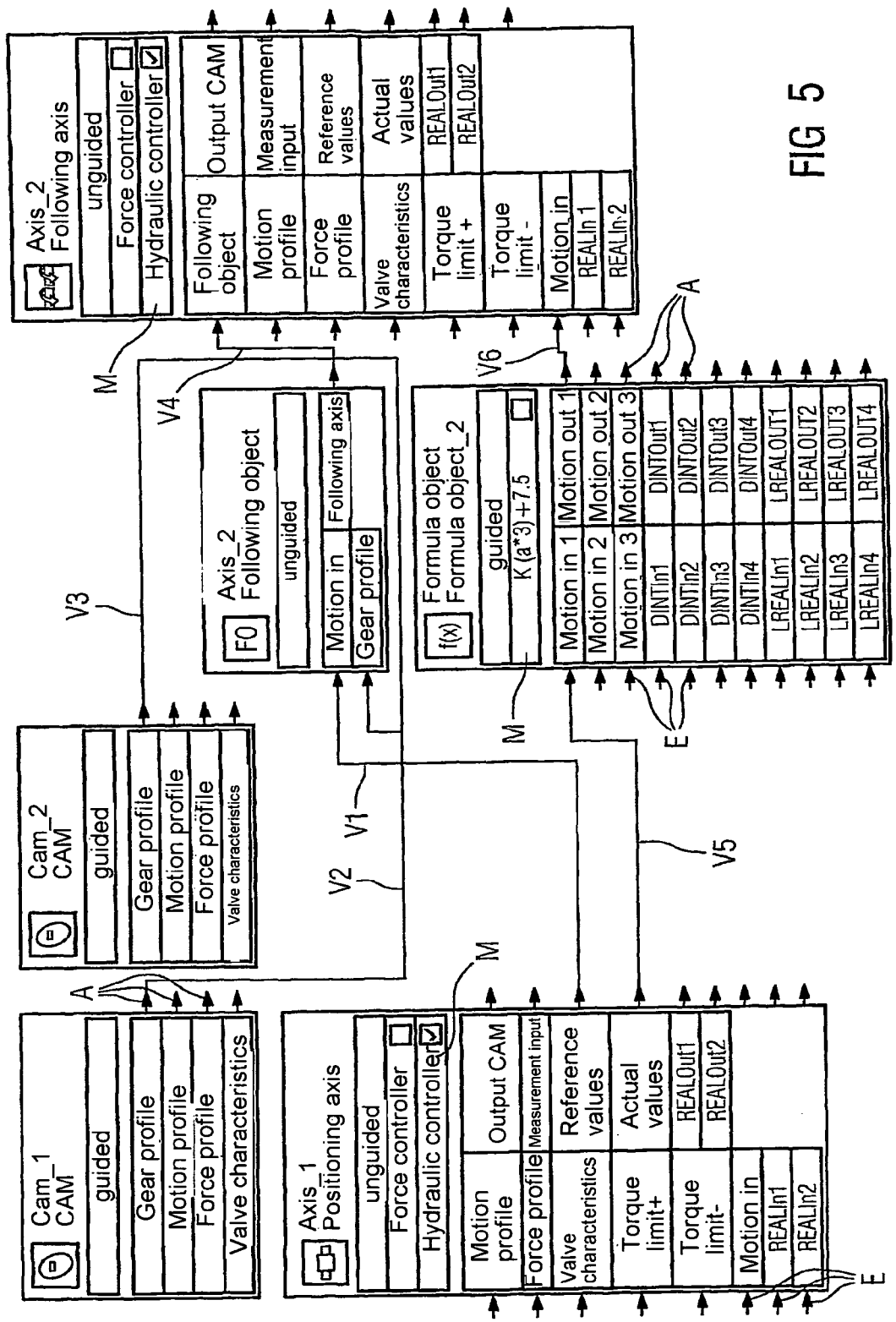
FIG. 5 an inventive visualization of the mechatronic model of FIG. 4 in a comprehensive representation.

However the graphic tool also enables a comprehensive representation of the mechatronic model in accordance with FIG. 5. Here, each input E and output A is provided with a corresponding designation relating to its function. In addition, setting menus M can still be offered in the individual technological objects, as is the case in the preceding case for the technological objects axis_2, formula object_2 and axis_3.

The individual technological objects can, for example, be linked with each other by clicking on the particular outputs and inputs A, E. In the present case, for example, axis_1 is connected to axis_2. Axis_2 is represented by two technological objects, one of these assuming the calculation of the synchronous operation ("following object"), and the other representing the following axis. In this way, a signal flow is defined which, for example, transmits an actual speed from axis_1 to axis_2. A second connection exists between the cam_1 and the axis_2. This means that the gear ratio profile of cam_1 is loaded into axis_2 via the connection V2. At the same time, a second gear ratio is loaded from cam_2 into axis_2 via the connection V3. According to predetermined conditions, the two gear ratios are then used as the basis for generating an output signal.

The computational object or formula object_2 receives an actual value from the positioning axis_1 via a further connection V5 and converts this into an output value (MotionOut1) according to a programmed-in formula. This value is passed on to the axis_2 via a connection V6. In the overall engineering mechatronic model of the machine, however, only the relevant aspects are represented. Non-relevant aspects such as the sequence programming are deliberately not reproduced.

In this way it is possible to configure the individual technological objects in a highly convenient manner. A corresponding programming environment for the sequence programming of the entire system is to be provided for, independently of the mechatronic model for the configuration.

The circuitry of the prepared technological objects is checked for consistency, so that errors in the circuitry can be automatically corrected. Errors of this nature cannot be prevented from the outset, even if the graphic mechatronic model offers the project designer comprehensive support.

In the case of the direct graphic creation of a mechatronic machine model, it is possible initially to start with virtual mechatronic modules or placeholder objects. This is then followed by the assignment of the placeholder objects to real actuators or sensors (e.g. sensors or axes), or alternatively the virtual mechatronic units (e.g. virtual reduction of the machine cycle) are retained. The inclusion of mechatronic modules without mechanical corollary (e.g. virtual axis) serves to simplify the mechatronic representation and realization of the production task.

The mechatronic signal shape present at a particular point in time, and/or the function elements or technological objects active at a specific moment can be represented in an online view on the mechatronic model. His means that in certain circumstances it is possible to recognize in real time when a module is activated or deactivated.

Figure 3:
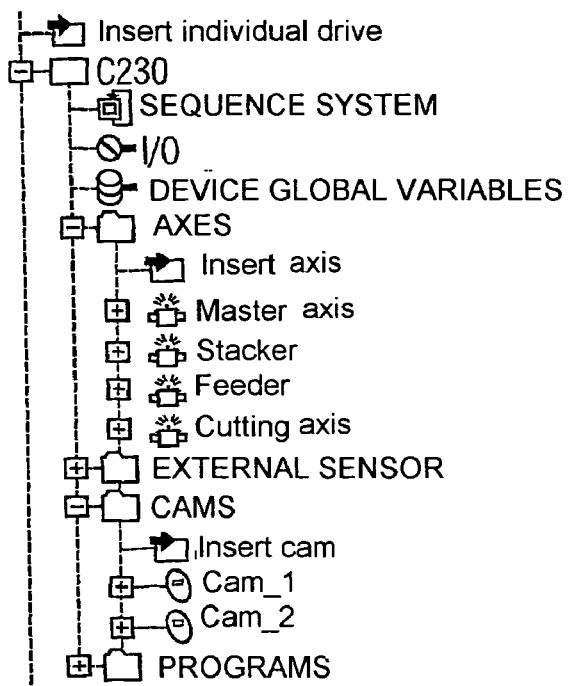
FIG. 3 an automation project in a project navigator in list form in accordance with the prior art.

The graphic, mechatronic machine model as shown in FIGS. 4 and 5 can be derived from an existing project list of the function objects, technological objects and machine modules as represented in FIG. 3. To this end, the ability to switch between a view of the machine model and a view of the project structure or list is provided for.

The invention claimed is:

1. A system to configure an automated production machine, comprising:
    an automated production machine having a plurality of function elements; and
    a programming device, the programming device being provided for a configuration of the automated production machine and having
        a mechatronic model of at least a portion of the automated production machine;
        technological objects that represent the function elements of the automated production machine and are used in the mechatronic model, the technological objects represented in a graphic form;
        a graphically displayed signal flow of mechatronic values between the technological objects;
        a modification device configured to graphically modify a signal interconnection between at least two technological objects, wherein the signal interconnection comprises at least one input line and at least one output line with respect to said at least two technological objects, wherein the signal interconnection is modified by a redirection of at least one signal line from at least one of said at least two technological objects to at least another one of said at least two technological objects in response to a graphical port selection performed by an operator on a graphical representation of a plurality of configurable input ports and a plurality of configurable output ports associated with said at least two technological objects, the graphical port selection performed by the operator defining the redirection of said at least one signal line; and
        a test device that checks the consistency of the signal flow of mechatronic values between the technological objects in the system,
    wherein the function elements of the automated production machine are parameterized and interconnected according to the configuration of the automated production machine.

2. The system as claimed in claim 1, wherein the signal flow contains information related to data selected from the group of: position, velocity, acceleration, pressure, force, torque and combinations thereof.

3. The system as claimed in claims 1, wherein the function elements comprise real and virtual elements.

4. The system as claimed in claim 1, wherein the function elements include a feature selected from the group consisting of: being instantiated, configured, parameterized and assigned commands.

5. The system as claimed in claim 1, wherein the programming device further comprises an activation device to activate and deactivate the technological objects.

6. The system as claimed in claim 1, wherein the programming device further comprises a transformation device to convert technological objects defined in at least one list to provide the mechatronic model with data into the technological objects represented in graphic form.

7. The system as claimed in claim 6, wherein the transformation device converts graphic technological objects into a list format.

8. A method performing by an automated production machine for configuring the automated production machine having function elements comprising:
    using the automated production machine having plurality of function elements;
    using a programming device for configuring the automated production machine;
    using a mechatronic model of at least a portion of the automated production machine using technological objects in the model representing the function elements of the automated production machine;
    graphically displaying the technological objects of the model;
    graphically defining a signal flow of mechatronic values between the technological objects;
    graphically modifying a signal interconnection between at least two technological objects, wherein the signal interconnection comprises at least one input line and at least one output line with respect to said at least two technological objects, wherein the signal interconnection is modified by redirecting at least one signal line from at least one of said at least two technological objects to at least another one of said at least two technological objects in response to a graphical port selecting performed by an operator on a graphical representation of a plurality of configurable input ports and a plurality of configurable output ports associated with said at least two technological objects, the graphical port selecting performed by the operator defining the redirecting of said at least one signal line;
    checking the consistency of the signal flow of mechatronic values between the technological objects; and
    parametrizing and interconnecting the function elements of the automated production machine according to the configuration of the automated production machine.

9. The method as claimed in claim 8, wherein an operation of the automated production machine is based on the configuration procedure.

10. The method as claimed in claim 8, wherein an operation of the automated production machine is based on the parameterization procedure.

11. The method as claimed in claim 8, wherein the signal flow contains information related to data selected from the group of: position, velocity, acceleration, pressure, force, torque and combinations thereof.

12. The method as claimed in claim 8, wherein the function elements comprise real and virtual elements.

13. The method as claimed in claim 8, wherein the function elements have a feature selected from the group consisting of: being instantiated, configured, parameterized and assigned commands.

14. The method as claimed in claim 8, wherein the technological objects are activated or deactivated.

15. The method as claimed in claims 8, wherein technological objects, which are defined in at least one list to provide the mechatronic model with data, are converted into technological objects represented in graphical form.

16. The method as claimed in claim 8, wherein technological objects are converted from a graphically representation into a corresponding list format for storage in a list.

* * * * *